United States Patent
Ponnarasu et al.

(10) Patent No.: US 10,481,723 B2
(45) Date of Patent: Nov. 19, 2019

(54) HOVER REJECTION THROUGH DYNAMIC THRESHOLDING

(71) Applicant: STMicroelectronics Asia Pacific Pte Ltd, Singapore (SG)

(72) Inventors: Manivannan Ponnarasu, Singapore (SG); Mythreyi Nagarajan, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 211 days.

(21) Appl. No.: 15/337,167

(22) Filed: Oct. 28, 2016

(65) Prior Publication Data

US 2018/0121010 A1  May 3, 2018

(51) Int. Cl.
*G06F 3/041* (2006.01)
(52) U.S. Cl.
CPC .. *G06F 3/0416* (2013.01); *G06F 2203/04101* (2013.01)
(58) Field of Classification Search
CPC ......... G06F 3/0416; G06F 2203/04101; G06F 3/044
See application file for complete search history.

(56) References Cited

U.S. PATENT DOCUMENTS

| | | | | |
|---|---|---|---|---|
| 8,432,170 B1* | 4/2013 | Walsh | ............ | G06F 3/0416 324/658 |
| 8,692,795 B1* | 4/2014 | Kremin | ............ | G06F 3/044 345/173 |
| 9,081,450 B1* | 7/2015 | Mohindra | ............ | G06F 3/044 |
| 2008/0012835 A1* | 1/2008 | Rimon | ............ | G06F 3/038 345/173 |
| 2010/0134422 A1* | 6/2010 | Borras | ............ | G06F 3/03547 345/173 |
| 2010/0134440 A1* | 6/2010 | Hayakawa | ............ | G06F 3/044 345/174 |
| 2012/0242617 A1* | 9/2012 | Lee | ............ | G06F 3/0418 345/174 |
| 2013/0155016 A1 | 6/2013 | Chang et al. | | |
| 2013/0241890 A1* | 9/2013 | Sharma | ............ | G06F 3/0426 345/175 |
| 2014/0168536 A1* | 6/2014 | Guo | ............ | G06F 3/044 349/12 |
| 2014/0210780 A1 | 7/2014 | Lee | | |

(Continued)

*Primary Examiner* — Sejoon Ahn
(74) *Attorney, Agent, or Firm* — Crowe & Dunlevy (57) ABSTRACT

Disclosed herein is a touch screen controller that calculates a variance of an island in acquired touch data values. Where the variance exceeds a variance threshold, the island is validated as a representing touch. Where the variance does not exceed the variance threshold, whether the island represents a touch or a hover is determined by calculating a sharpness by applying weights to nodes of the island, where neighboring nodes adjacent to a peak node are weighted less than non-neighboring nodes not adjacent to the peak node. An island strength threshold is determined as a function of a product of the variance and the sharpness. It is determined that the island represents a touch where a highest touch data value of the island is greater than the island strength threshold, and a hover where the highest touch data value of the island is less than the island strength threshold.

22 Claims, 7 Drawing Sheets

(56) References Cited

U.S. PATENT DOCUMENTS

| | | | |
|---|---|---|---|
| 2014/0240242 A1* | 8/2014 | Kawalkar | G06F 3/0418 345/173 |
| 2014/0253504 A1* | 9/2014 | Noshadi | H04M 1/72527 345/174 |
| 2015/0242050 A1* | 8/2015 | Huang | G06F 3/0418 345/174 |
| 2015/0253897 A1* | 9/2015 | Liang | G06F 1/16 345/174 |
| 2016/0077625 A1* | 3/2016 | Soo | G06F 3/044 345/174 |
| 2016/0195946 A1* | 7/2016 | Ahn | G06F 3/044 345/173 |
| 2017/0131798 A1 | 5/2017 | Geaghan et al. | |
| 2017/0153763 A1 | 6/2017 | Vavra et al. | |
| 2017/0177136 A1 | 6/2017 | Chandran et al. | |
| 2018/0074637 A1* | 3/2018 | Rosenberg | G06F 3/03545 |

* cited by examiner

| | | | | | |
|---|---|---|---|---|---|
| 19 | 24 | 24 | 10 | 0 | Tx_sharp | 430 |
| 24 | 210 | 218 | 27 | 2 | Rx_sharp | 381 |
| 19 | 202 | 221 | 26 | 3 | Sharp | 209 |
| 10 | 23 | 36 | 5 | 0 | Variance | 9 |
| 0 | 2 | 5 | 0 | 0 | VxS | 1881 |

FIG. 6A

| | | | | | |
|---|---|---|---|---|---|
| 0 | 12 | 37 | 38 | 16 | Tx_sharp | 272 |
| 0 | 46 | 166 | 172 | 50 | Rx_sharp | 329 |
| 0 | 55 | 182 | 178 | 46 | Sharp | 165 |
| 0 | 9 | 48 | 54 | 13 | Variance | 4 |
| 0 | 0 | 0 | 7 | 0 | VxS | 660 |

FIG. 6B

HOVER REJECTION THROUGH DYNAMIC THRESHOLDING

TECHNICAL FIELD

This disclosure relates to the field of touch screen devices, and more particularly, to the rejection of hover inputs through dynamic thresholding based on sharpness and variance.

BACKGROUND

Mobile electronic devices, such as smartphones, tablets, and smartwatches are in wide use in the world today. Such electronic devices typically employ a touch sensitive display for both data display as well as to receive user input. Most of these touch sensitive displays utilize capacitive touch sensing.

A typical touch sensitive display includes a display layer constructed from technology such as LCD, IPS, or AMO-LED, as well as a sensing layer. A transparent layer is adjacent to and spaced apart from the display layer. A typical sensing layer includes a plurality of parallel drive lines, and a plurality of parallel sensing lines. The sensing lines capacitively intersect the drive lines. In operation, a single drive line is driven with a wave, such as a square wave or sine wave. The capacitance between the sensing lines and the driven drive line is sensed at the point where they intersect. Presence of a human finger or a conductive object such as a passive stylus alters the expected capacitance at the intersection point, and by measuring the change in capacitance, a touch between the finger or conductive object and the touch sensitive display can be detected.

Using current techniques, accurately determining whether a passive stylus is touching or hovering over a touch screen can be difficult due to the small size of the tip of the passive stylus. Therefore, further development in this area is desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is an electronic device. The electronic device includes a touch screen controller that calculates a variance of an island in acquired touch data values. Where the variance exceeds a variance threshold, the island is validated as a representing touch. Where the variance does not exceed the variance threshold, whether the island represents a touch or a hover is determined by calculating a sharpness by applying weights to nodes of the island, where neighboring nodes adjacent to a peak node are weighted less than non-neighboring nodes not adjacent to the peak node. An island strength threshold is determined as a function of a product of the variance and the sharpness. It is determined that the island represents a touch where a highest touch data value of the island is greater than the island strength threshold, and represents a hover where the highest touch data value of the island is less than the island strength threshold.

The touch screen controller may apply weights to nodes of the island by applying a first weight to the peak node, applying a second weight to the neighboring nodes, and applying a third weight to the non-neighboring nodes. The second weight may be less than the third weight. The third weight may be less than the first weight.

The touch screen controller may calculate the sharpness as:

$$\text{Sharpness} = \frac{\text{Weight1} * C - \text{Weight2} * (B + D) - \text{Weight3} * (A + E)}{C},$$

where c represents a touch data value of the peak node, b and d represent touch data values of the neighboring nodes, and a and e represent touch data values of the non-neighboring nodes. Weight1 may be 1.5, Weight2 may be 0.5, and Weight3 may be 1.25.

The touch screen controller may be further configured to normalizing the sharpness, and may determine the island strength threshold as a function of a product of the variance and the normalized sharpness. The normalizing may be a peak normalizing, such as a five point peak normalizing. The island may be a three node by three node island.

Another aspect is directed to an electronic device including a touch screen, and a touch screen controller coupled to the touch screen. The touch screen controller may be configured to identify an island in a matrix of acquired touch data values, the island comprising nodes containing adjacent touch data values indicating a potential touch of a touch screen. The touch screen controller may further calculate a variance of the island, and where the variance exceeds a variance threshold, validate the island as a representing touch. Where the variance does not exceed the variance threshold, the touch screen controller may determine whether the island represents a touch or a hover by calculating a sharpness by applying weights to the nodes of the island, where a neighboring node that is adjacent to a peak node containing a peak acquired touch data value is weighted less than a non-neighboring node that is not adjacent to the peak node. A product of the variance and the sharpness may be calculated, and an island strength threshold may be determined as a function of the product. It may be determined that the island represents a touch where a highest touch data value of the island is greater than the island strength threshold. It may be determined that the island represents a hover where the highest touch data value of the island is less than the island strength threshold.

Also disclosed herein is a method aspect. The method may include calculating a variance of an island in acquired touch data values. Where the variance exceeds a variance threshold, the island may be validated as a representing touch. Where the variance does not exceed the variance threshold, it may be determined whether the island represents a touch or a hover by calculating a sharpness by applying weights to nodes of the island, where neighboring nodes adjacent to a peak node are weighted less than non-neighboring nodes not adjacent to the peak node, and determining an island strength threshold as a function of a product of the variance and the sharpness. It may be determined that the island represents a touch where a highest touch data value of the island is greater than the island strength threshold, and that the island represents a hover where the highest touch data value of the island is less than the island strength threshold.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
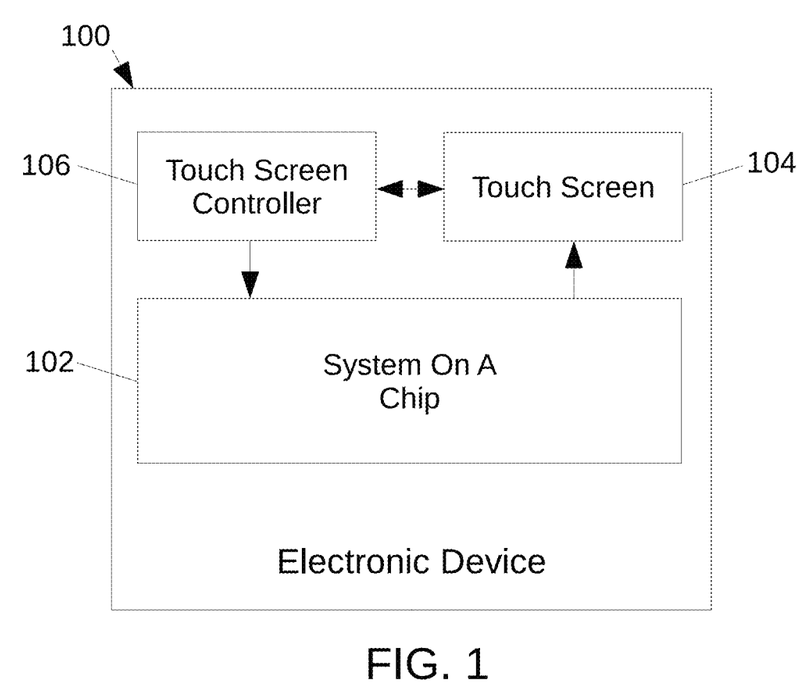
FIG. 1 is a block diagram of an electronic device on which the techniques described herein may be implemented.
Figure 1A:
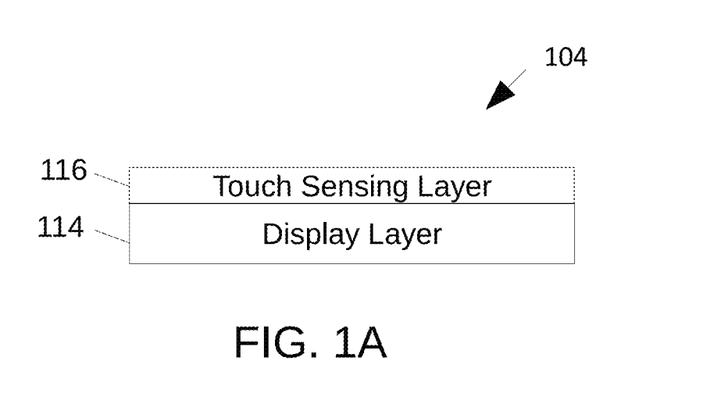
FIG. 1A is a cutaway view of the touch sensitive display of the touch screen of FIG. 1 showing the components thereof.
Figure 1B:
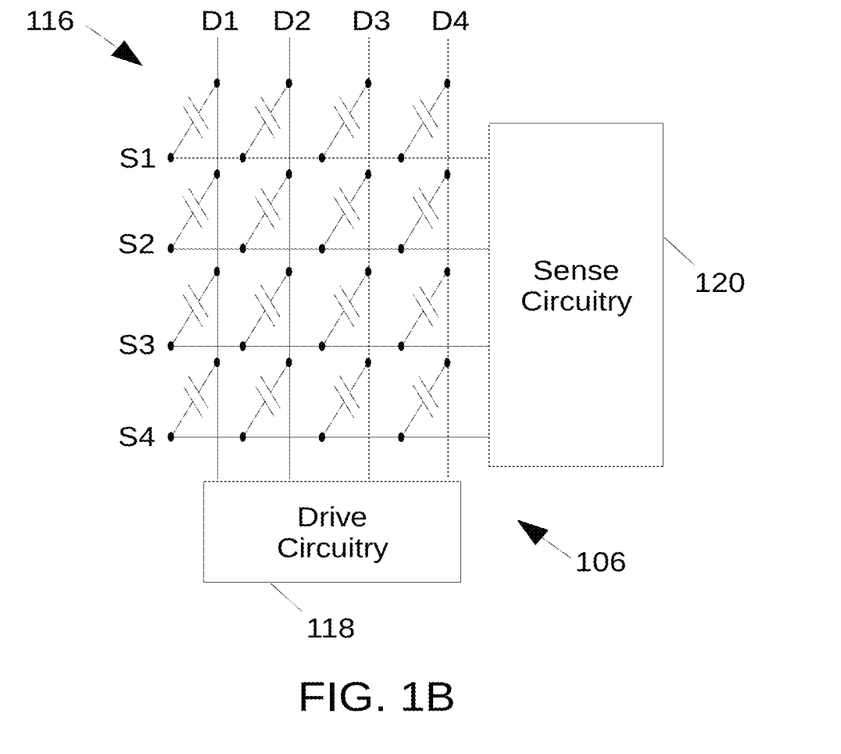
FIG. 1B is a schematic block diagram of the touch screen controller of FIG. 1, and its interconnection with the sense and drive lines of the touch sensing layer of the touch sensitive display of FIG. 1A.

With initial reference to FIGS. 1-1B an electronic device 100 is now described. The electronic device 100 may be a smartphone, smartwatch, wearable, tablet, laptop, or other suitable portable electronic device. The electronic device 100 includes a system on a chip 102 that receives input from a touch screen controller 106 and provides output to a touch module 104.

The touch module 104 includes a display layer 114, with a touch sensing layer 116 adjacent thereto. The touch sensing layer 116 includes drive lines D1-D4 that intersect sense lines S1-S4. The sense lines S1-S4 are coupled to the sense circuitry 120, while the drive lines D1-D4 are coupled to drive circuitry 118. The sense circuitry 120 and drive circuitry 118 collectively form at least part of a touch screen controller 106. At each intersection point between the drive line D1 and the sense lines S1-S4, a capacitance is formed.

In operation, the driving circuitry 118 drives the drive lines D1-D4 with periodic signals, such as sine waves or square waves. At each intersection point between the drive lines D1-D4 and the sense lines S1-S4, the respective sense line S1-S4 incurs a charge injection proportional to the voltage at the drive lines D1-D4 and a capacitance between the respective sense line S1-S4 and the drive lines D1-D4 is at that intersection point. These capacitances vary in proximity to conductive objects, such as human fingers and styluses, and are measured by the touch screen controller 106 and processed to be touch data values stored in a matrix having entries that correspond to the various intersections of the drive lines D1-D4 with the force lines S1-S4.

As explained, a stylus may be used to provide input to the touch screen 104 instead of a finger. Some styluses may have a tip for contacting the touch screen 104 that is similar in diameter to the portion of a finger that touches the touch screen 104. However, some styluses may have tips that are substantially smaller in diameter than the portion of a finger that touches the touch screen 104, for example less than 2 mm diameter, or even equal to or less than 1 mm in diameter (i.e. 0.8 mm). When using a stylus with a smaller tip, on the order of less than 2 mm, the smaller size may make it difficult for the touch screen to accurately determine whether it is sensing a hover by a finger or a touch by a stylus. To provide for this precise recognition, weights are applied to touch values in a specific fashion when calculating sharpness.

Figure 2:
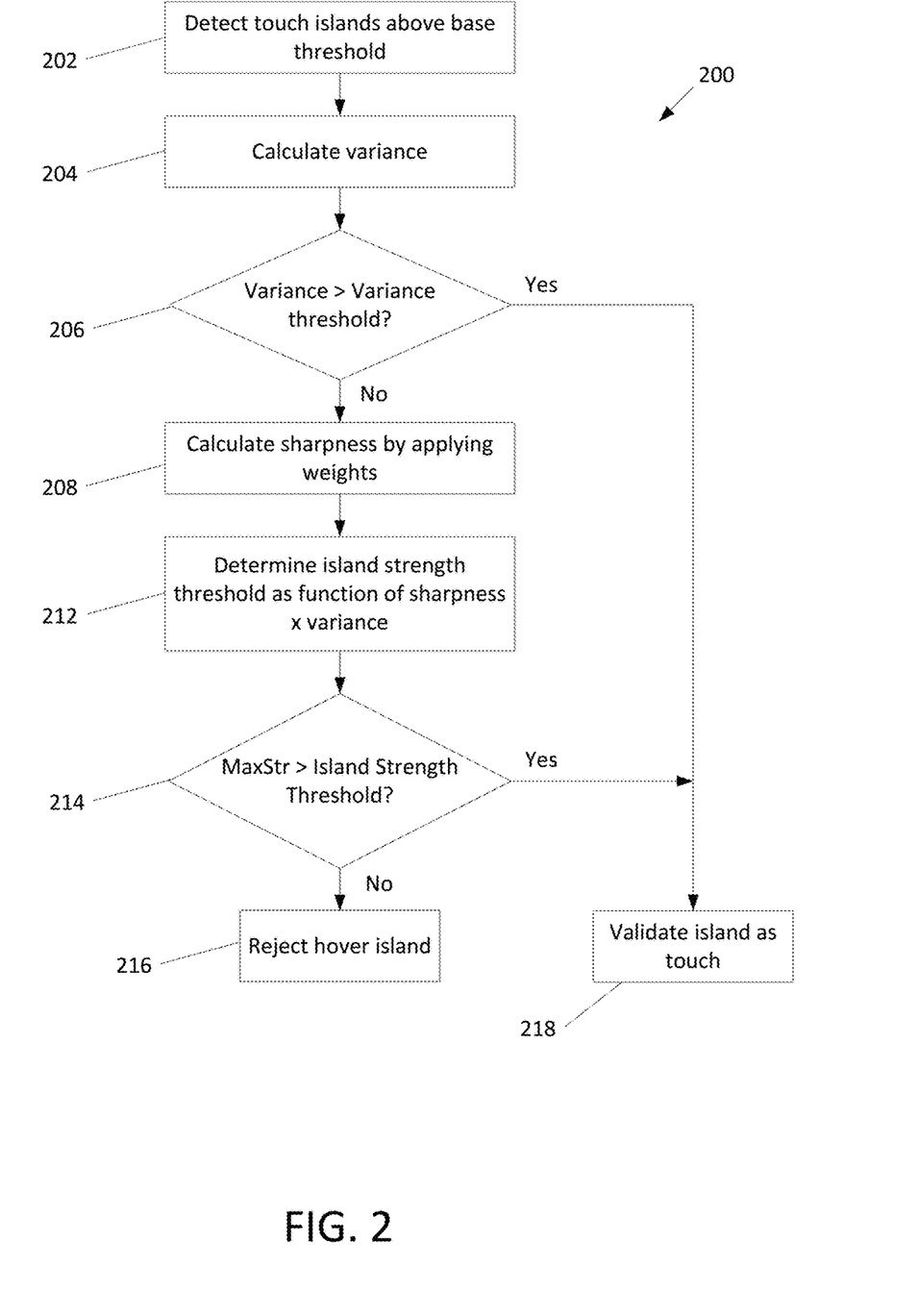
FIG. 2 is a flowchart of a method of determining whether a touch island represents a hover or a physical touch, in accordance with this disclosure.

These techniques will now be described with reference to the flowchart 200 of FIG. 2. To start, the touch screen controller 106 acquires touch data values corresponding to different locations of the touch sensitive display 104 (Block 202). The touch screen controller 106 then identifies an island in the touch data, the island being comprised of touch data values (also referred to as strength values) acquired from adjacent locations of the touch sensitive display 104 that indicate a potential touch by being above a base strength threshold (also Block 202).

Figure 3:
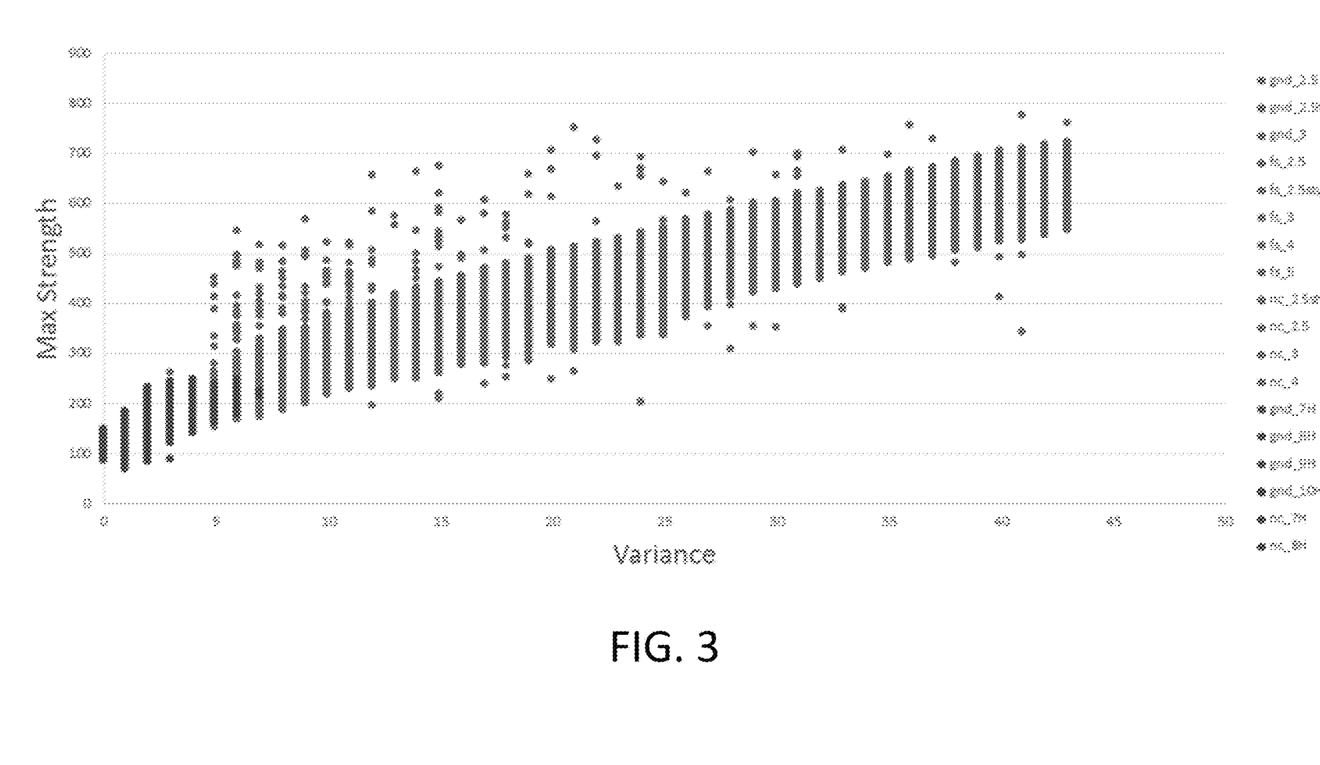
FIG. 3 is a graph showing variance vs max strength for sample touch islands.

The variance of the island is then calculated (Block 204). A graph of variance as calculated for sample touch islands is shown in FIG. 3. In this graph, the Y-axis represents the max strength of touch data, and the X-axis represents the variance for those strength values. The variance is then compared to a variance threshold (Block 206). The variance threshold is set such that if the variance is greater, the island can be validated as a touch (Block 218). The variance threshold itself is an empirical value set based on a priori, or on the fly, analysis. As an example, where the data is as shown in FIG. 3, the variance threshold would be set to 8.

If the variance is less than the variance threshold, then operation proceeds with calculating the sharpness of the island (Block 208).

Figure 6A:
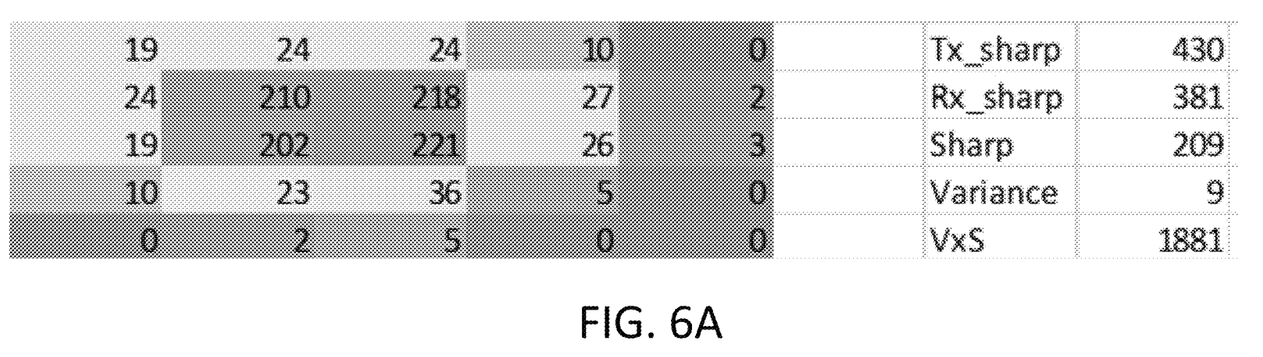
FIG. 6A is a chart showing a touch island and strength values thereof.
Figure 6B:
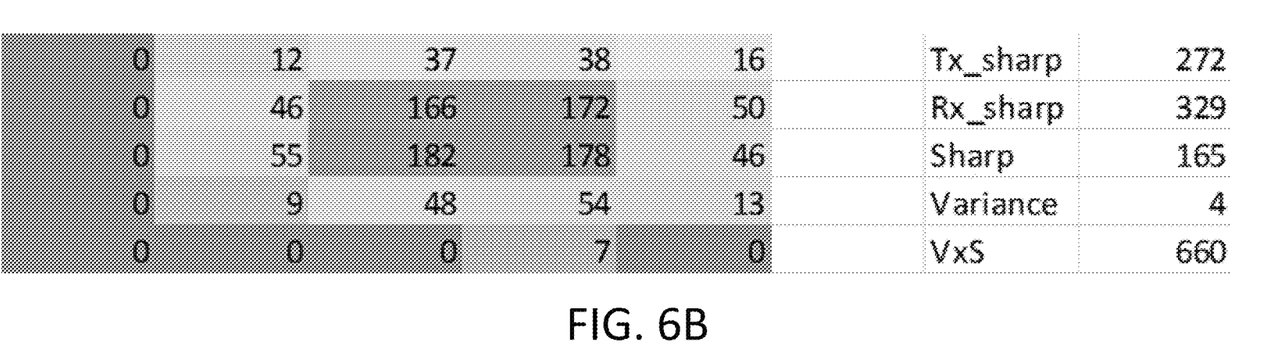
FIG. 6B is another chart showing a touch island and strength values thereof.

Shown in FIGS. 6A-6B are sample 3×3 touch islands that have been identified. The nodes of column and row c contain the highest strength values. The nodes of columns and rows b and d are neighboring nodes of rows and columns c, and the nodes of columns and rows a and e are non-neighboring nodes of rows and columns c. The sharpness is calculated by separately calculating the sense and drive line sharpnesses. The sense line sharpness (otherwise known as the receive sharpness) is calculated as: when strength (touch signal values) "spills" to the non-neighboring nodes a and e.

$$RX\ Sharpness = \frac{Weight1 * c - Weight2 * (b+d) - Weight3 * (a+e)}{c}$$

The drive line sharpness (otherwise known as the transmit sharpness) is calculated as:

$$TX\ Sharpness = \frac{Weight1 * c - Weight2 * (b+d) - Weight3 * (a+e)}{c}$$

Here, the TX Sharpness refers to vertical sharpness while the RX Sharpness refers to horizontal sharpness, however, the drive lines D1-D4 and sense lines S1-S4 may be arranged in any fashion, and thus in some cases TX Sharpness may refer to horizontal sharpness while RX Sharpness refers to vertical sharpness.

As can be seen for both equations, weights are applied to the strengths of rows a, b, c, d, e. The first weight (Weight1) is applied to the peak nodes c; the second weight (Weight2) is applied to the neighboring nodes b and d; and the third weight (Weight3) is applied to the non-neighboring nodes a and e. The second weight is less than the third weight so that when strength (touch signal values) "spills" to the non-neighboring nodes a and e, the sharpness drops precipitously. In some cases, the third weight may be greater than the second weight but less than the first weight. For example, weights found to be of use in producing accurate results are 1.5 for the first weight, 0.5 for the second weight, and 1.25 for the third weight. It should be appreciated that other weights can be used and either pre-programmed into the touch screen controller 106, can be calculated by the touch screen controller 106 in an initial startup phase, can be calculated by the touch screen controller 106 on the fly, or can be received from the SoC 102.

The sharpness is then normalized via peak normalization to produce a five point sharpness with peak normalization. This final normalized sharpness can be mathematically represented as:

$$\text{Normalized Sharpness} = \frac{RX\ \text{Sharpness} + TX\ \text{Sharpness}}{SumStr},$$

where SumStr represents a sum of the strengths of the nodes of the touch island. Since this normalization is performed by peak, the variation for a given size of stylus between the peak node C and the neighboring nodes B, D and the non-neighboring nodes A, E would otherwise be relatively small. However, the weighting above corrects this, and results in a sharpness drop when strength (touch signal values) "spills" to the non-neighboring nodes A and E. An island strength threshold is then calculated as a function of a product between the normalized sharpness and the variance (Block 212).

Performed with the above analysis, the data shown in FIG. 6A yields a touch, while the data shown in FIG. 6B yields a hover.

Figure 4:
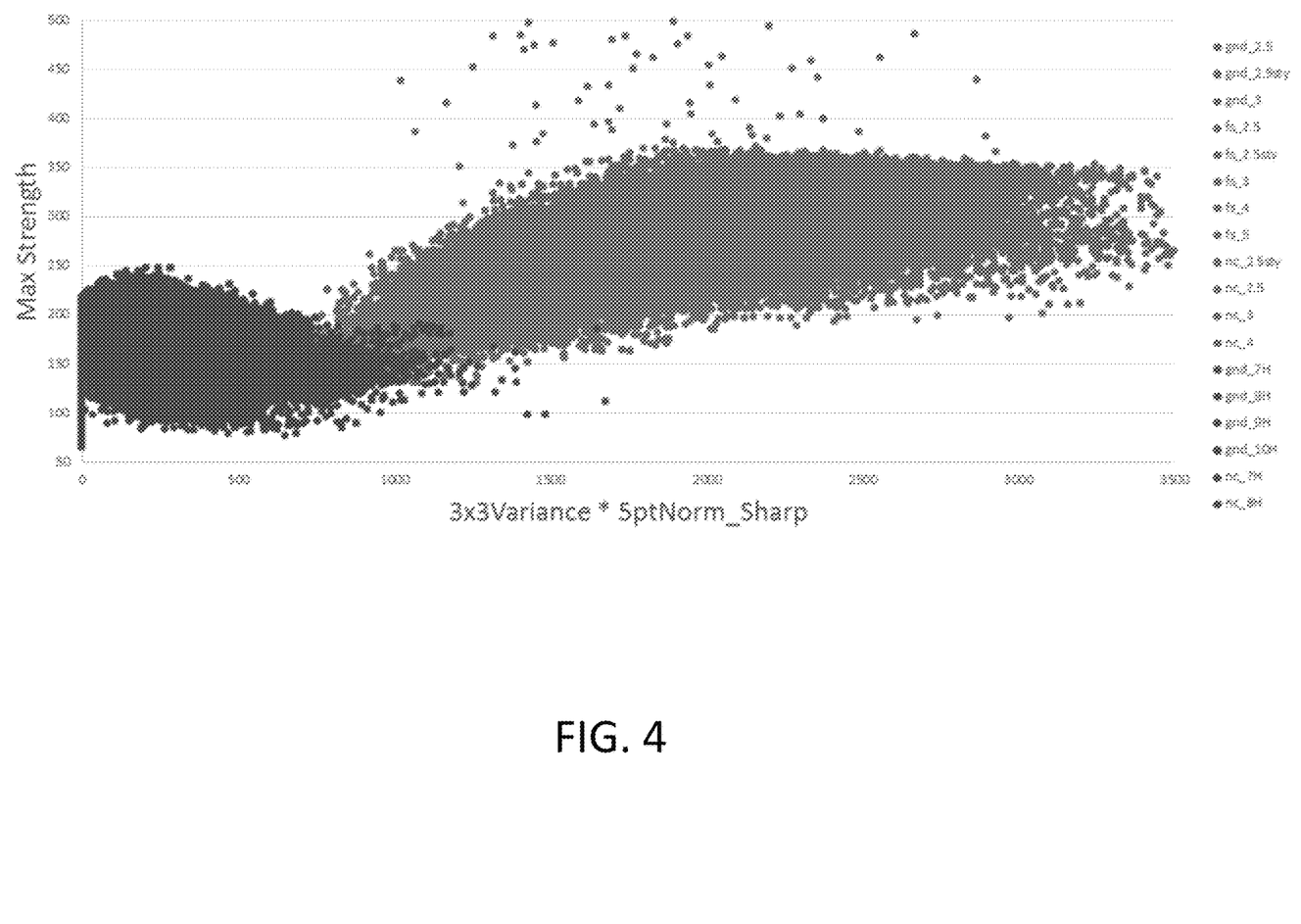
FIG. 4 is a graph showing max strength vs. the product of variance and sharpness for sample touch islands.
Figure 5:
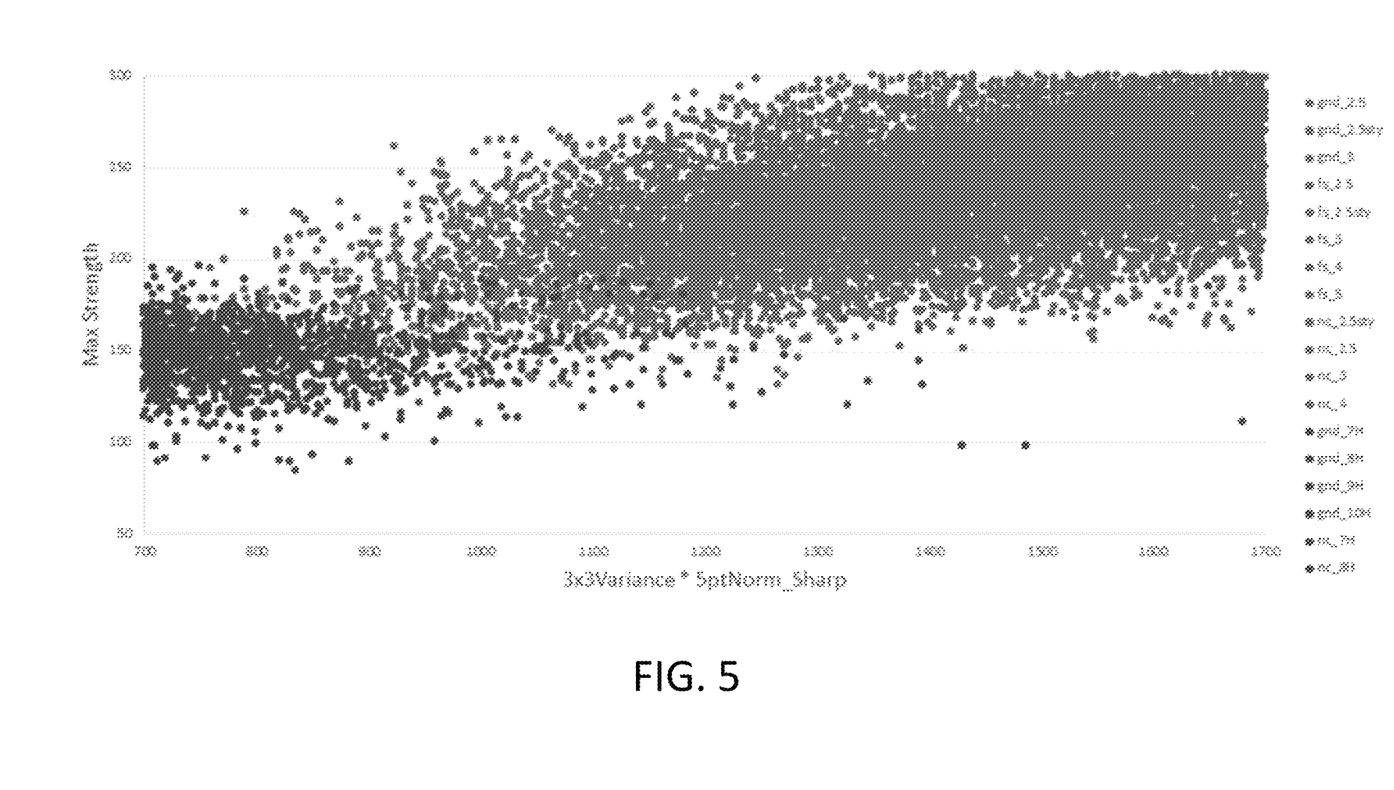
FIG. 5 is a more detailed graph showing max strength vs. the product of variance and sharpness for sample touch islands.

Sample products between the normalized sharpness and the variance are shown in FIGS. 4-5. In the shown overlap region, the max strength of the hover touches is less than the actual touches. Therefore, if the island strength threshold is calculated properly, it is possible to eliminate many, most, almost all, or all of the hover touches.

Where the maximum strength value of the island exceeds the island strength threshold (Block 214), the island is then validated as a touch island (Block 218). Where the maximum strength value of the island fails to exceed the island strength threshold (Block 214), then the island is rejected as a hover (216).

Coordinates of a touch location on the touch screen may then be determined by the touch screen controller 106 based on the island being a valid touch island, and passed to the system on a chip 102 for use in application or operating system execution.

Although the above has been described with reference to the touch screen controller 106 performing the described steps and techniques, it should be appreciated that in some applications, the SoC 102 may instead perform the above described steps and techniques.

Each of the steps performed above may be performed in a period of time quicker than a human is capable of, such as in under 1 second, or even under 0.5 second, or even under 0.1 second, usually on the order of 10s of milliseconds. It should be appreciated that the touch screen controller 106 is a specific purpose computing device, with transistors and/or logic gates specifically programmed so as to carry out the techniques described herein. Thus, the touch screen controller 106 contains measurable and observable physical differences over an unprogrammed generic purpose computer or processor. It should also be understood that the techniques described herein necessarily arise out of touch screen technology—that is, in the absence of capacitive touch screens, the techniques herein would not exist. Thus, these techniques are not directed to disembodied information processing, but are instead directed to the determination of the spatial relationship between two physical objects, the stylus and the touch screen. Moreover, these techniques improve the performance of the touch screen technology to which they are applied, increasing the precision and accuracy of the touch detection performed by the touch screen.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. An electronic device, comprising:
a touch screen controller configured to:
   acquire touch data values;
   locate an island in the acquired touch data values, the island being a set comprised of touch data values of the acquired touch data values that indicate a potential touch by being above a touch threshold value;
   calculate a variance of the island, wherein the variance of the island indicates how far the touch data values of the set are separated from a mean of the set;
   if the variance exceeds a variance threshold, validate the island as a representing touch; and
   if the variance does not exceed the variance threshold, determine whether the island represents a touch or a hover by:
      calculating a sharpness by applying weights to nodes of the island, wherein neighboring nodes adjacent to a peak node are weighted less than non-neighboring nodes not adjacent to the peak node, wherein each node of the island is a touch data value of the set;
      determining an island strength threshold based upon multiplying the variance by the sharpness;
      determining that the island represents a touch where a highest touch data value of the island is greater than the island strength threshold, and
      determining that the island represents a hover where the highest touch data value of the island is less than the island strength threshold.

2. The electronic device of claim 1, wherein the touch screen controller applies weights to nodes of the island by:
   applying a first weight to the peak node;
   applying a second weight to the neighboring nodes; and
   applying a third weight to the non-neighboring nodes;
   wherein the second weight is less than the third weight.

3. The electronic device of claim 2, wherein the third weight is less than the first weight.

4. The electronic device of claim 2, wherein the touch screen controller calculates the sharpness as:

$$\text{Sharpness} = \frac{\text{Weight1} * C - \text{Weight2} * (B + D) - \text{Weight3} * (A + E)}{C},$$

where C represents a touch data value of the peak node, B and D represent touch data values of the neighboring nodes, and A and E represent touch data values of the non-neighboring nodes.

5. The electronic device of claim 4, wherein Weight1 is 1.5, Weight2 is 0.5, and Weight3 is 1.25.

6. The electronic device of claim 1, wherein the touch screen controller is further configured to normalize the sharpness; and wherein the touch screen controller determines the island strength threshold as a function of a product of the variance and the normalized sharpness.

7. The electronic device of claim 6, wherein normalize the sharpness comprises a peak normalizing.

8. The electronic device of claim 7, wherein the peak normalizing comprises a five point peak normalizing.

9. The electronic device of claim 1, wherein the island is a three node by three node island.

10. An electronic device, comprising:
a touch screen; and
a touch screen controller coupled to the touch screen and configured to:
acquire touch data values;
locate an island in the acquired touch data values, the island being a set comprised touch data values of the acquired touch data values that indicate a potential touch of a touch screen by being above a touch threshold value; and
calculate a variance of the island, wherein the variance of the island indicates how far the touch data values of the set are separated from a mean of the set;
if the variance exceeds a variance threshold, validate the island as a representing touch; and
if the variance does not exceed the variance threshold, determine whether the island represents a touch or a hover by:
calculating a sharpness by applying weights to nodes of the island, wherein a neighboring node that is adjacent to a peak node containing a peak acquired touch data value is weighted less than a non-neighboring node that is not adjacent to the peak node, wherein each node of the island is a touch data value of the set;
multiplying the variance by the sharpness;
determining an island strength threshold as a function of the multiplication of the variance by the sharpness;
determining that the island represents a touch where a highest touch data value of the island is greater than the island strength threshold; and
determining that the island represents a hover where the highest touch data value of the island is less than the island strength threshold.

11. The electronic device of claim 10, wherein the touch screen controller applies weights to nodes of the island by:
applying a first weight to the peak node;
applying a second weight to the neighboring node;
applying a third weight to the non-neighboring node; and
wherein the second weight is less than the third weight.

12. The electronic device of claim 11, wherein the third weight is less than the first weight.

13. The electronic device of claim 11, wherein the touch screen controller calculates the sharpness as:

$$\text{Sharpness} = \frac{\text{Weight1} * C - \text{Weight2} * (B + D) - \text{Weight3} * (A + E)}{C},$$

where C represents a touch data value of the peak node, B and D represent touch data values of the neighboring nodes, and A and E represent touch data values of the non-neighboring nodes.

14. The electronic device of claim 13, wherein Weight1 is 1.5, Weight2 is 0.5, and Weight3 is 1.25.

15. A method, comprising:
acquire touch data values;
locate an island in the acquired touch data values, the island being a set comprised of touch data values of the acquired touch data values that indicate a potential touch by being above a touch threshold value;
calculate a variance of the island, wherein the variance of the island indicates how far the touch data values of the set are separated from a mean of the set;
if the variance exceeds a variance threshold, validate the island as a representing touch; and
if the variance does not exceed the variance threshold, determine whether the island represents a touch or a hover by:
calculating a sharpness by applying weights to nodes of the island, wherein neighboring nodes adjacent to a peak node are weighted less than non-neighboring nodes not adjacent to the peak node, wherein each node of the island is a touch data value of the set;
determining an island strength threshold based upon multiplying product of the variance by the sharpness;
determining that the island represents a touch where a highest touch data value of the island is greater than the island strength threshold; and
determining that the island represents a hover where the highest touch data value of the island is less than the island strength threshold.

16. The method of claim 15, wherein weights are applied to nodes of the island by:
applying a first weight to the peak node;
applying a second weight to the neighboring nodes;
applying a third weight to the non-neighboring nodes; and
wherein the second weight is less than the third weight.

17. The method of claim 16, wherein the third weight is less than the first weight.

18. The method of claim 16, wherein the sharpness is calculated as:

$$\text{Sharpness} = \frac{\text{Weight1} * C - \text{Weight2} * (B + D) - \text{Weight3} * (A + E)}{C},$$

where C represents a touch data value of the peak node, B and D represent touch data values of the neighboring nodes, and A and E represent touch data values of the non-neighboring nodes.

19. The method of claim 18, wherein Weight1 is 1.5, Weight2 is 0.5, and Weight3 is 1.25.

20. The method of claim 15, further comprising normalizing the sharpness; and wherein the island strength threshold is determined as a function of a product of the variance and the normalized sharpness.

21. The method of claim 20, wherein the normalizing comprises a peak normalizing.

22. The method of claim 21, wherein the peak normalizing comprises a five point peak normalizing.

* * * * *

UNITED STATES PATENT AND TRADEMARK OFFICE
CERTIFICATE OF CORRECTION

PATENT NO. : 10,481,723 B2
APPLICATION NO. : 15/337167
DATED : November 19, 2019
INVENTOR(S) : Manivannan Ponnarasu et al.

Page 1 of 1

It is certified that error appears in the above-identified patent and that said Letters Patent is hereby corrected as shown below:

In the Claims

At Column 8, Claim Number 15, Line 28, please delete the phrase "product of".

Signed and Sealed this
Eighteenth Day of August, 2020

Andrei Iancu
*Director of the United States Patent and Trademark Office*